L. MORRISON & A. G. HARMS.

Saw-Hangings.

No. 5,647. Reissued Nov. 4, 1873.

WITNESSES:-

J. Homer Hildreth

John H. Harris

INVENTORS

Lawrence Morrison

Amos G. Harms by Cochrane & Malcomson their Attys.

AM. PHOTO-LITHOGRAPHIC Co. N.Y. (OSBORNE'S PROCESS)

UNITED STATES PATENT OFFICE.

LAWRENCE MORRISON AND AMOS G. HARMS, OF ALLEGHENY CITY, PA.

IMPROVEMENT IN SAW-HANGINGS.

Specification forming part of Letters Patent No. 101,492, dated April 5, 1870; reissue No. 5,647, dated November 4, 1873; application filed July 24, 1873.

DIVISION B.

*To all whom it may concern:*

Be it known that we, LAWRENCE MORRISON and AMOS G. HARMS, of Allegheny City, in the county of Allegheny and State of Pennsylvania, have invented certain new and useful Improvements in Saw-Hangings, relating more particularly to the portion thereof known as the saw-buckle; and we do hereby declare that the following is a full and clear description of the same, reference being had to the accompanying drawing, in which—

Figure 1:
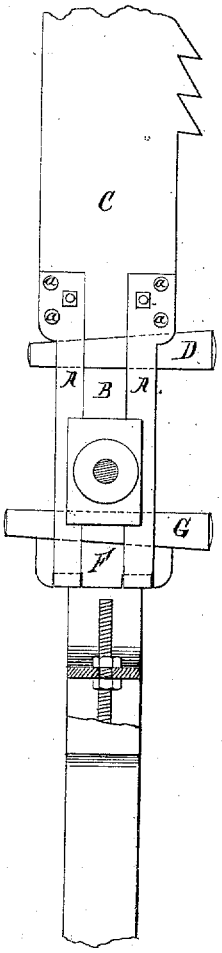
Figure 2:
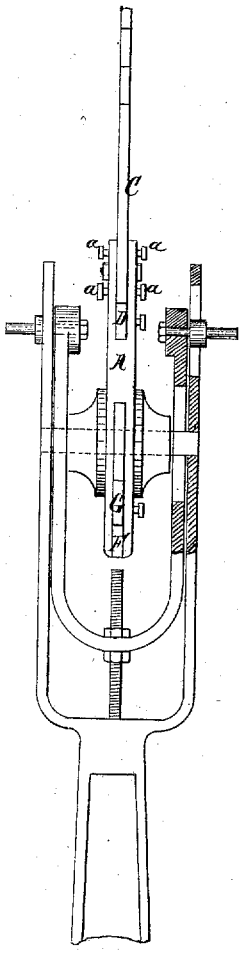

Figure 1 is a side view of the saw-buckle attached to the saw and a portion of the pitman-head shown in section. Fig. 2 is a front elevation of the same.

This invention relates to a new construction of saw-buckle, by means of which the saw and buckle may be easily detached from the pitman-head without being separated from each other, as hereinafter more particularly set forth.

In order to enable those skilled in the art to make and use our improved saw-buckle, we will proceed to describe its construction and manner of using the same.

In the drawing, A A represent the two side pieces of the saw-buckle, which are joined together by the center piece B; or the two side pieces A A and the center B may be made all in one piece. The side pieces are slotted at their upper end to receive the saw-blade C, which is fastened to the buckle by bolts passing through the side pieces and the saw. The slots in the saw-buckle being made a little wider than the thickness of the saw, the same is ranged by the set-screws *a a*, while all looseness or play of the saw is taken up by the key D, which is introduced into the slot underneath the end of the saw, and acts as a wedge to hold it rigidly in position. The lower part of the saw-buckle is made open to receive the journal-boxes of the wrist-pin, such journal-boxes being held in place by the gib F and key G, which pass through vertical slots in the lower part of the side pieces A A.

From the foregoing description it will be perceived that the saw and buckle may be easily detached from the pitman-head, for sharpening or other purposes, without the inconvenience of disconnecting them from each other, as the key F and gib G are readily removed and the buckle then slipped on or off the journal-boxes of the wrist-pin.

What we claim as new, and desire to secure by Letters Patent, is—

An open-bottomed saw-buckle, constructed substantially in the manner shown and described.

LAWRENCE MORRISON.
AMOS G. HARMS.

Witnesses:
L. R. LINDSAY,
H. A. SPANGLER.